(12) United States Patent
Kedlaya et al.

(10) Patent No.: US 11,165,626 B2
(45) Date of Patent: Nov. 2, 2021

(54) MANAGEMENT OF EVENTS RECEIVED FROM NETWORK DEVICES

(71) Applicant: HEWLETT PACKARD ENTERPRISE DEVELOPMENT LP, Houston, TX (US)

(72) Inventors: Naveena Kedlaya, Bangalore (IN); Geoffery Schunicht, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 36 days.

(21) Appl. No.: 16/697,338

(22) Filed: Nov. 27, 2019

(65) Prior Publication Data

US 2021/0160123 A1 May 27, 2021

(51) Int. Cl.
*G06F 15/173* (2006.01)
*H04L 12/24* (2006.01)
*H04L 12/26* (2006.01)

(52) U.S. Cl.
CPC ........ *H04L 41/0213* (2013.01); *H04L 41/046* (2013.01); *H04L 41/22* (2013.01); *H04L 43/0852* (2013.01)

(58) Field of Classification Search
CPC ... H04L 41/0213; H04L 41/046; H04L 41/22; H04L 43/0852
See application file for complete search history.

(56) References Cited

U.S. PATENT DOCUMENTS

| | | | |
|---|---|---|---|
| 2005/0027848 A1* | 2/2005 | Kamenetsky | ..... H04L 29/06027 709/223 |
| 2005/0114829 A1* | 5/2005 | Robin | ..... G06Q 10/06 717/101 |
| 2010/0100899 A1* | 4/2010 | Bradbury | ..... H04L 65/4092 725/29 |
| 2012/0304253 A1* | 11/2012 | Newman | ..... G06Q 20/4016 726/1 |
| 2014/0189084 A1* | 7/2014 | Kamenetsky | ..... H04L 67/18 709/223 |
| 2020/0356354 A1* | 11/2020 | Mitra | ..... G06F 16/903 |

* cited by examiner

*Primary Examiner* — Thanh T Nguyen
(74) *Attorney, Agent, or Firm* — Hewlett Packard Enterprise Patent Department

(57) ABSTRACT

Examples described herein relate to method and system for managing events received from network devices. A management station may receive events from the network devices. Further, the management station may determine a delay based at least on a rate at which the events are received at the management station. Moreover, the management station may schedule processing of the events based on the delay.

18 Claims, 5 Drawing Sheets

MANAGEMENT OF EVENTS RECEIVED FROM NETWORK DEVICES

BACKGROUND

A computing environment, such as a data center, may generate events. The events may be indicative of functioning of devices of the computing environment. The devices of the computing environment are hereinafter referred to as network devices. Sometimes, several events may be generated by one or more network devices in a short period of time due to performance of an operation in the computing environment. The operation may be, for example, powering on or restarting a server in the computing environment, powering on an enclosure having several servers, adding a server to the enclosure, replacing power units of several rack-mount servers, and the like.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
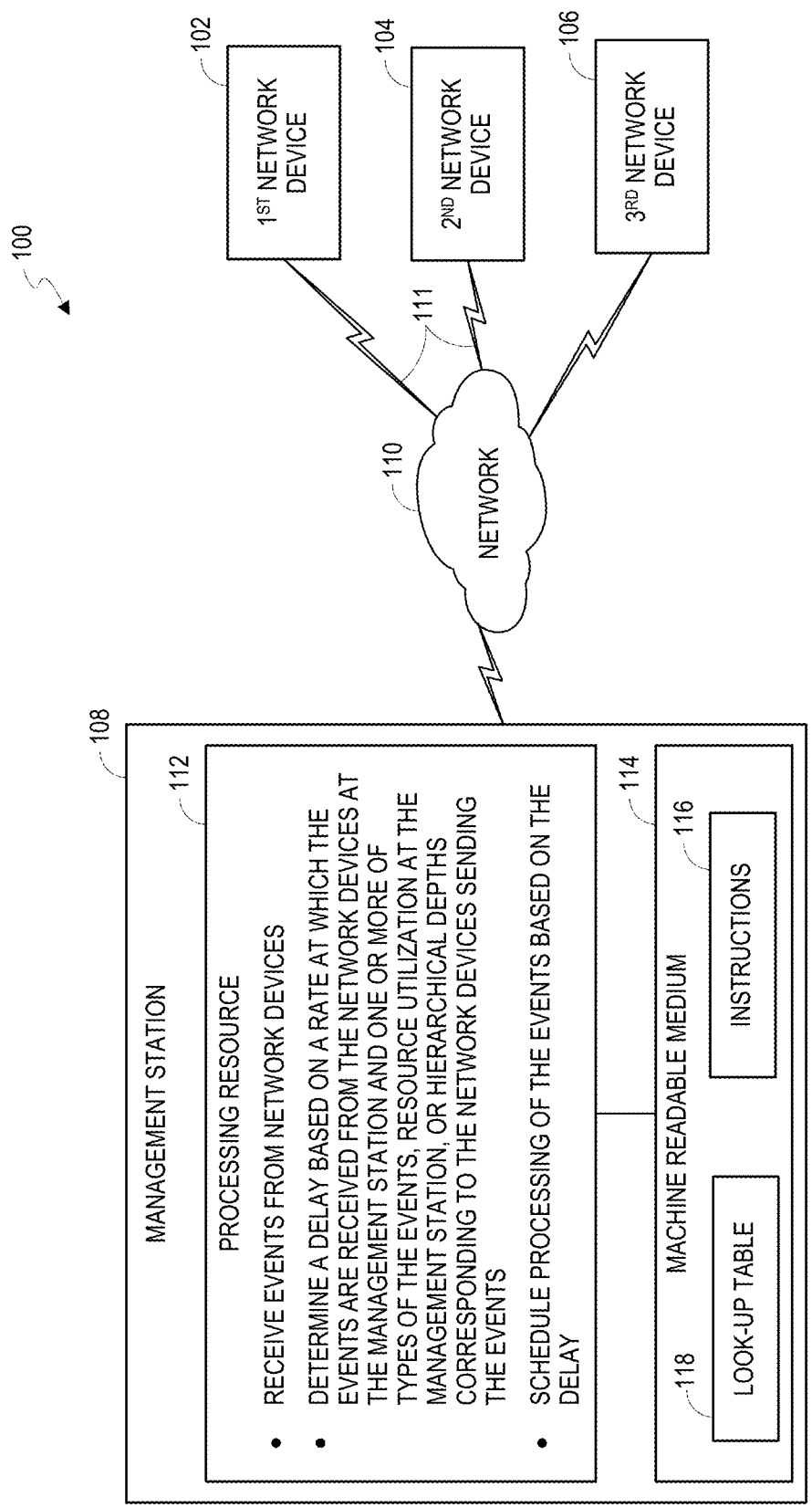
FIG. 1 illustrates a system including a management station for managing events received from network devices, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Network devices in a computing environment, such as a data center, may generate events. The network devices may include any electronic device capable of storing data, processing data, and/or communicating data with external devices over a network. Examples of the network devices may include, but are not limited to, a server, a storage device, a network switch, a router, a mobile communication device, a desktop computer, a portable computer, a network device enclosure, or combinations thereof. The server may be a blade server, for example. The storage device may be a storage blade, for example. The network device enclosure may be a blade enclosure housing one or more blades (e.g., blade servers, storage blades, etc.). The events which may be indicative of functioning of network devices of the computing environment. Sometimes, several events may be generated by one or more network devices in a short period of time due to performance of an operation in the computing environment. The operation may be, for example, powering on or restarting a server in the computing environment, powering on an enclosure having several servers, adding a server to the enclosure, replacing power units of several rack-mount servers, and the like.

Typically, several events may be generated in the computing environment depending on various operations performed in the computing environment or in reaction to any change in an environment surrounding the network devices (e.g., due to change in temperature). An example operation performed in the computing environment may be powering-on an enclosure housing several network devices (e.g., servers). Example events corresponding to the powering-on of the enclosure may include a server powered-on event from each server in the enclosure, events indicating discovery of various components of each server, and a server post discovery complete event from each server.

The events from the network devices may be received by a management station. Sometimes, an event may have to be acted upon by the management station, i.e., the event may trigger a job to be performed. The management station may in-turn determine one or more jobs to be performed for the received events. Further, the management station may perform the determined jobs. For example, an event indicating that a network device such as a server is powered on, may trigger an inventory collection job. Such inventory collection job may involve collecting details of various components in the network device. Further, in another example, in response to the server post discovery complete event, the management station may perform the inventory collection job.

Acting upon each such event, for example, to collect inventory for each such power-on event, may lead to wastage of computational resources of the management station. Moreover, since several events may be received due to performance of any operation at the network devices, acting upon all events may increase resource utilization at the management station and, at times, may lead to overloading of the management station. The resource utilization of the management station may change dramatically while processing various events in response to the received events. While processing the events, if the resource utilization of the management station is not controlled, it may lead to the loss of functionality, data and even the availability of the management station causing unexpected downtime losses to customers.

The resource utilization in the management station may be directly or sometimes exponentially proportional to the number of events being processed by the management station. For example, in software defined datacenters with highly interconnected, heterogeneous and sometimes self-managed network devices, it may be difficult to foresee an amount of load, the network devices may incur on the management station with change notifications and events. It is these kind of events, if left unchecked, can cause dramatic increase in resource utilization of the management station. Such increased resource utilization may lead to disruption of ongoing jobs and various services at the management station, leading to unrecoverable and inconsistent state of the devices, configurations and complete disruption of management station's availability.

In order to obviate one or more of the abovementioned challenges, a method for processing events at the management station is proposed, in accordance with aspects of the present disclosure. The method includes receiving, by the management station, events from network devices. The management station may then determine a delay based at least on a rate at which the events are received at the management station. In some examples, the delay may be fine-tuned based on various other parameters such as types of the events, resource utilization at the management station, hierarchical depths corresponding to the network devices sending the events, or combinations thereof. Further, processing of the events may be scheduled based on the delay. In some examples, the management station may wait for a time duration corresponding to the delay to before initiating processing of the events. In certain examples, the management station may perform deduplication for a set of similar type of events received in a deduplication time window which is determined based on the delay.

As will be appreciated, by scheduling the processing of the events at the management station, resource utilization of the management station may be controlled. Also, selective delaying of the processing of consecutive events and/or adjusting deduplication window based on the delay may further enhance performance of the management station while ensuring completion of desired jobs corresponding the received events. Moreover, due to such controlled use of the resources of the management station, reliability of the management station and hence, customer experience may be enhanced.

Referring now to drawings, in FIG. 1, an example system 100 is depicted, in accordance with an example. The system 100 may include network devices 102, 104, and 106 (hereinafter collectively referred to as network devices 102-106); and a management station 108. The management station 108 may be coupled to the network devices 102, 104, and 106 via a network 110. In some example configurations, the management station 108 and the network devices 102-106 may be disposed at remote locations from each other, for example, in different rooms, different buildings, different cities, or in different countries. Whereas, in certain example configurations, both the management station 108 and the network devices 102-106 may be disposed in a close proximity of each other, for example, in a common IT infrastructure such as an enclosure or a rack.

The network 110 may be a medium that interconnects the network devices 102-106 and the management station 108. Examples of the network 110 may include, but are not limited to, an Internet Protocol (IP) or non-IP-based local area network (LAN), wireless LAN (WLAN), metropolitan area network (MAN), wide area network (WAN), a cellular communication network, and the Internet. Communication over the network 110 may be performed in accordance with various communication protocols such as, but not limited to, Transmission Control Protocol and Internet Protocol (TCP/IP), User Datagram Protocol (UDP), IEEE 802.11, and/or cellular communication protocols over communication links 111. The communication links 111 may be enabled via a wired (e.g., copper, optical communication, etc.) or wireless (e.g., Wi-Fi®, cellular communication, satellite communication, Bluetooth, etc.) communication technologies. In some examples, the network 110 may be enabled via private communication links including, but not limited to, communication links established via Bluetooth, cellular communication, optical communication, radio frequency communication, and the like. In some examples, the private communication links may be direct communication links between each of the network devices 102-106 and the management station 108.

The network devices 102-106 may include any electronic device capable of storing data, processing data, and/or communicating data with external devices over the network 110. Examples of the network devices 102-106 may include, but are not limited to, a server, a storage device, a network switch, a router, a mobile communication device, a desktop computer, a portable computer, a network device enclosure, or combinations thereof. The server may be a blade server, for example. The storage device may be a storage blade, for example. The network device enclosure may be a blade enclosure housing one or more blades (e.g., blade servers, storage blades, etc.). In some examples, the network devices 102-106 may include a storage space for storing data and/or one or more processing resources to process the data during their respective operations. In some examples, all of the network devices 102-106 may be of same types (e.g., severs). In certain examples, the network devices 102-106 may include different types of devices. For instance, while the network device 102 may be a server, the network devices 104 and 106 may be storage devices.

As will be understood, the network devices 102-106 may generate various events as a result of operations performed by the network devices 102-106. By way of example, the network devices 102-106 may generate events due to one or more of malfunctioning, problems, errors, change in configurations, firmware updates, and one or more actions such as power-ON, power-OFF, and restart corresponding to the network devices 102-106. By way of example, change in configurations of the network devices 102-106 may include adding a server to an enclosure, replacing power units of several rack-mount servers, and the like. The events generated by the network devices 102-106 may include, but are not limited to, alerts and lifecycle events. Examples of the lifecycle events may include events such as resource added, resource updated, resource removed, resource status change, and the like. The network devices 102-106 may communicate such events to the management station 108.

In some examples, the management station 108 may be implemented as physical computing device. In some other examples, the management station 108 may be hosted on a computing device as a virtual machine, a container, or a containerized application, in which such virtual machine may utilize resources (e.g., processing power and/or storage capacity) of the host computing device. The container or containerized application may be located on a single host computing device or distributed across multiple computing devices. In certain examples, the management station 108 may be integrated into a composable computing platform, for example, blade products. The composable computing platform may integrate resource pools, such as, compute, storage, and communication fabric into a single physical infrastructure. By way of example, the network 110 may represent a portion of the communication fabric of the composable computing platform. Further, in some examples, one or more of the network devices 102-106 may represent a portion of the compute resources disposed in the composable computing platform. Furthermore, in some examples, one or more of the network devices 102-106 may represent a portion of the storage resources disposed in the composable computing platform.

Further, the composable computing platform may include a physical appliance which can be operated as a composer module. The composer module may enable a single interface for assembling and re-assembling the compute, storage, and communication fabric resources into any desired configuration. The composer module may deploy, monitor, and update the infrastructure from one interface and one unified application programming interface (API). In one example, the management station 108 may be implemented in the composer module of such composable computing platform, as an application or as a virtual machine.

The management station 108 may receive the events from the network devices 102-106 and may perform actions/jobs corresponding to the events to fulfill requirements desired for the events. In some examples, as depicted in FIG. 1, the management station 108 may include a processing resource 112 and a machine-readable medium 114. In an instance, when the management station 108 is implemented as a virtual machine or as an application, the processing resource 112 and the machine-readable medium 114 may respectively represent a processing resource and a machine-readable medium of a computing device that hosts the management station 108 as the virtual machine or application.

The machine-readable medium 114 may be any electronic, magnetic, optical, or other physical storage device that may store data and/or executable instructions. Therefore, the machine-readable medium 114 may be, for example, Random Access Memory (RAM), an Electrically Erasable Programmable Read-Only Memory (EEPROM), a storage drive, a flash memory, a Compact Disc Read Only Memory (CD-ROM), and the like. The machine-readable medium 114 may be non-transitory. As described in detail herein, the machine-readable medium 114 may be encoded with executable instructions 116 for performing one or more methods, for example, methods described in FIGS. 4 and 5.

The processing resource 112 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing of the instructions 116 stored in the machine-readable medium 114, or combinations thereof. The processing resource 112 may fetch, decode, and execute the instructions 116 stored in the machine-readable medium 114 to manage processing of the events received from the network devices 102-106. As an alternative or in addition to executing the instructions 116, the processing resource 112 may include at least one integrated circuit (IC), control logic, electronic circuits, or combinations thereof that include a number of electronic components for performing the functionalities intended to be performed by the management station 108.

As previously noted, the management station 108 may receive the events from the network devices 102-106. Accordingly, the management station 108 may determine one or more jobs corresponding to the received events. Further, the management station 108 may perform the determined jobs. In some examples, the machine-readable medium 114 may include a look-up table 118 storing relationship between events and jobs. Table-1, presented below, may represent one such example look-up table 118.

TABLE 1

Example look-up table

| Events | Jobs |
|---|---|
| Alert (e.g., server reset detected) | None |
| Resource Updated (e.g. Operating System Settings update) | Refresh updated resource |
| Status Changed (e.g., server powered ON) | Read and validate current power state of server |
| Resource Removed (e.g. server fan removed) | Validate removal and update inventory in the management station 108 |
| Post Discovery Complete (e.g. server post discovery complete) | Refresh inventory data that can only be read under full power |

The look-up table 118 may include list of jobs that the management station 108 may perform corresponding to various event received by the management station 108. The management station 108 may act upon the events by performing one or more jobs corresponding to the events to fulfill requirements desired for the events. By way of example, in response to an event indicating that the network device 102 (e.g., a server) is powered on, the management station 108 may trigger an inventory collection job. Such inventory collection job may involve collecting details of various components in the network device 102. As will be described in detail hereinafter, the management station 108 may act upon the received events such that resource utilization of the management station 108 may be controlled and reliability of the management station 108 may be enhanced in comparison to traditional approaches even in the situation of increased event load at the management station 108.

In certain instances, inflow of the events at the management station 108 may be uncontrolled and/or dynamic over a period of time. In accordance with the aspects of the present disclosure, the management station 108 may schedule the processing of the events based on a rate at which the events are received at the management station 108. In some examples, the rate at which the events are received at the management station 108 may include a base average event rate ($R_b$) of receiving the events and a moving average event rate ($R_m$) of receiving the events at the management station 108 (see FIG. 2). The term "base average event rate" may refer to a rate of receiving events from all network devices 102-106 during their normal operation. By way of example, the normal operation of the network devices 102-106 may represent operation of such network devices when tasks, such as, configuration change, power ON, power OFF, firmware update, and the like, which may invoke generation of increased number of events are not being performed on the network devices 102-106. The term "moving average event rate" may refer to a rate of receiving events from all network devices 102-106 over a given time duration.

Figure 2:
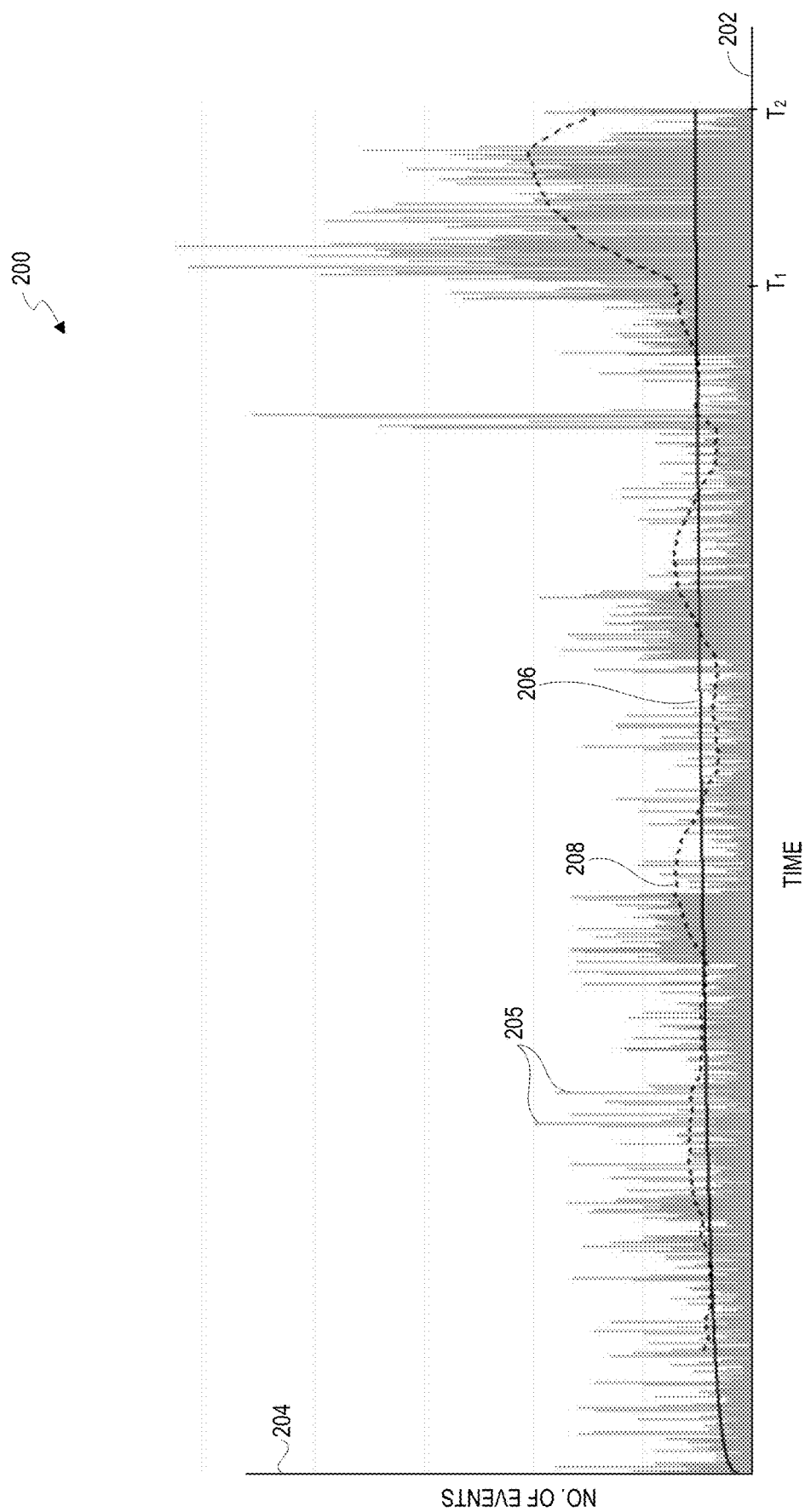
FIG. 2 shows a graphical representation depicting aggregated events received by a management station from network devices, in accordance with an example.

Referring now to FIG. 2, a graphical representation 200 depicting aggregated events received by the management station 108 from the network devices 102-106 is depicted, in accordance with an example. In the graphical representation 200 of FIG. 2, the reference numerals 202 and 204 respectively represent X-axis and Y-axis. The X-axis 202 may represent time and Y-axis 204 may represent number of events. Further, bars 205 may represent number of events received collectively from the network devices 102-106 at respective time on the Y-axis 204. In some examples, a line 206 (shown as a solid line) may represent the base average event rate (e.g., the base average event rate ($R_b$)) of the events received from the network devices 102-106. Further, in some examples, a line 208 (shown as a dashed line) may represent the moving average event rate (e.g., the moving average event rate ($R_m$)).

Turning back to FIG. 1, in some examples, the management station 108 may determine the base average event rate by averaging lowest event arrival rate from each network device 102-106. It may be apparent that the base average event rate may vary as the number of network devices sending the events to the management station 108 increases or decreases. Further, in some examples, for a given time duration, the management station 108 may determine the moving average event rate by dividing a sum of events received by the management station 108 by the number of network device sending these events. It may be apparent that the moving average event rate may vary as the number of operations/tasks performed at the network devices 102-106 varies. For example, as depicted in FIG. 2, the moving average event rate is higher than the base average event rate in a time duration $T_1$-$T_2$.

Further, in some examples, the management station 108 may determine a delay ($T_d$) based at least on the rate at which the events are received at the management station 108. More particularly, the management station 108 may determine the delay based on the base average event rate and the moving average event rate. By way of example, the management station 108 may calculate the delay using following equation (1).

$$T_d = \frac{(R_b * R_m)}{N} \%  \quad \text{Equation (1)}$$

where, N represents a number of network devices that are sending events to the management station 108 at a rate higher than the base average event rate. In some examples, the delay ($T_d$) may be converted to milliseconds by multiplying the value determined using equation (1) by 1000. In some examples, the delay ($T_d$) may be obtained by multiplying a parameter $$\frac{(R_b * R_m)}{N}$$

in milliseconds by a multiplication factor to have larger value of the delay ($T_d$). Such multiplication factor may be. Non-limiting examples of such multiplication factor may be any value in the range of 2 to 20.

By way of example, the management station 108 may be configured to manage events from 500 servers (i.e., network devices), out of which, 88 servers may send events above the base average event rate. The base average event rate determined by the management station 108 is 50 events/minute and the moving average event rate determined by the management station 108 is 40 events/minute. For the referenced data, the delay ($T_d$) may be determined as $$T_d = \frac{(50 * 40)}{88} \% = \sim 23\% = 230 \text{ ms}.$$

In addition to the rate of receiving the events, in certain instances, types of the events received at the management station 108, resource utilization at the management station 108, hierarchical depths corresponding to the network devices 102-106 sending the events, or combinations thereof, may also influence the number of jobs that can be handled by the management station 108 at a given point in time. For example, certain types of events such as the lifecycle events including, but not limited to, a resource added event, a resource deleted event, a resource update event, a resource status change event, a resource power-ON event, a resource power-OFF event, or combinations thereof may lead to increased number of jobs to be performed by the management station 108 in comparison to jobs needed to address events, such as, alerts. Therefore, the management station 108 may consider the type of event as one parameter in fine-tuning the delay ($T_d$).

In some examples, the management station 108 may determine the types of the event based on historical performance data of the management station 108. Over the period of time, the management station 108 may have collected data about event types and corresponding number of jobs and resource utilization. The management station 108 may utilize such historical performance data to identify the types of events processing of which will be scheduled based on the calculated delay. In certain other examples, the types of events to be considered for scheduling may be predefined or pre-stored in the management station 108. Further, in some examples, the resource utilization (i.e., percentage utilization of the processing resource and/or machine-readable medium) at the management station 108 may also impact number of jobs that may be performed at the management station 108 at the given point in time. Therefore, the management station 108 may consider the resource utilization of the management station 108 as one parameter in fine-tuning the delay ($T_d$).

Moreover, in some examples, the network devices such as the network devices 102-106 or sub-components of the network devices may be arranged in a hierarchical arrangement in accordance with one or more protocols. Such protocols may define rules and/or guidelines for arranging the network devices in the hierarchical arrangement. Redfish Specification may be an example of such protocol which defines an example tree structure (e.g., a Redfish Resource Tree) for arranging the network devices in hierarchical arrangement. A hierarchical depth of a network device may refer to a positioning of the network device in the hierarchical arrangement, for example, the Redfish Resource Tree, in which the network devices are arranged/defined. As will be understood, the Redfish Resource Tree may be accessible through a well-known starting Uniform Resource Identifier (URI). A client (e.g., the management station 108 in the present case) may discover the resources available on a Redfish Service by following resource hyperlinks from a base of the tree. Table-2 represented below depicts details of event created by such network devices with corresponding hierarchical depths.

TABLE 2

Example events

| Event number | Date | Device | Type of Network Device | Event Type | Hierarchical Depth |
|---|---|---|---|---|---|
| 1 | 3/5/2019 5:19 | Hardware A -/rest/server-hardware/123 | Server Hardware | Resource Updated | /redfish/v1/Systems/1 |
| 2 | 3/5/2019 6:37 | Hardware B -/rest/server-hardware/1234 | Server Hardware | Resource Updated | /redfish/v1/Systems/1/Smart Storage/Array Controllers/0/DiskDrives/0 |

As depicted in Table-2, network devices such as different server hardware (hardware A, hardware B) generate lifecycle events such as "Resource Updated." In case of event-1, the server hardware A generating the event is arranged at a much higher hierarchical depth in comparison to the server hardware B generating the event-2. If a lifecycle event (e.g., event-1 in Table-2) is originated from a hardware at higher level in the Redfish Resource Tree, the management station 108 has to traverse the Redfish Resource Tree to understand what really got updated that caused the lifecycle event-1. In particular, the management station 108 may need to make multiple calls to the server hardware A to reach an updated leaf element in the corresponding Redfish Resource Tree. In another example, the event-2, includes much elaborate details of the event origin/hierarchical depth of the originating network device/hardware. In such instance, the management station 108 may easily determine which leaf sub resource was updated with very few calls to the server hardware B. Accordingly, the management station 108 may incur reduced resource usage in addressing event-2 in comparison to addressing event-1. The feature of the hierarchical depth is described hereinabove with reference to the Redfish Specification for illustration purposes. It may be noted that any other arrangement of the network devices in accordance with any other appropriate protocols is also envisioned without limiting scope of the present disclosure.

In some examples, the management station 108 may also maintain, in the machine-readable medium 114, a mapping (not shown) of the network devices 102-106 and corresponding hierarchical depth. Accordingly, when an event is received, the management station 108 may determine the hierarchical depth of the network device sending the event using such mapping. In some other examples, the event received by the management station 108 may include information about the hierarchical depth. For example, the event may include information such as the URI of a resource originating the event. Accordingly, when an event is received, the management station 108 may determine the hierarchical depth of the network device sending the event using such URI.

Further, in some examples, the management station 108 may calculate a fine-tuned delay ($T_{fd}$) using following equation (2).

$$T_{fd}(E_i) = \text{Avg}(T_{fd}, R_u, W_{depth\&type}, W_{predef}) * 1000 \text{ ms} \quad \text{Equation (2)}$$

where, $E_i$ may represent an event type or identifier of one or more events processing of which may be scheduled based on the calculated delay, $R_u$ may represent a percentage resource utilization (i.e., % utilization of the processing resource 112 and the machine-readable medium 114) at the management station 108 at given point in time, $W_{depth\&type}$ may represent a weight component corresponding to the hierarchical depth of a given network device or a set of network devices and a type of the event, $W_{predef}$ may be determined by the management station 108 based on historical performance data for events and/or the network devices. In some examples, different types of the events may be handled by different type of software modules within the management station 108. In certain examples, $W_{predef}$ may be determined by such software modules. The term "set" as used may refer to a group of one or more elements. The element may be a network device, a parameter, or an event, for example.

In some examples, in order to process the events, the management station 108 may utilize one or more software defined consumer modules corresponding to the events. In some examples, the consumer modules may provide details of the event identifier ($E_i$) indicative of events, processing of which may be scheduled by the management station 108. For instance, while one consumer module may indicate the processing resource 112 not to stagger (described later) power ON events, another consumer module may indicate the processing resource 112 to stagger firmware update events, and yet another consumer module may indicate the processing resource 112 to deduplicate (described later) certain events before staggering.

Continuing the same example illustrated hereinabove, where the management station 108 is described as managing 500 servers (i.e., network devices), out of which 88 servers are sending events above a base average event rate. The base average event rate determined was 50 events/minute and the moving average event rate determined was 40 events/minute. Further, CPU utilization (i.e., utilization of the processing resource 112) is 90% and memory usage (i.e., utilization of the machine-readable medium 114) is 80% leading to an average resource utilization ($R_u$) as 85%. Further, a value of the predefined weight component ($W_{predef}$) determined by the management station 108 is 60. For the referenced data, the fine-tuned delay may be determined as $T_{fd}(E_i)$=Avg (23, 85, 0, 60)*1000 ms=420 ms.

In the description hereinabove, it is described that the management station 108 determines the delay ($T_d$) followed by fine-tuning of the delay ($T_d$) to determine the fine-tuned delay fine-tuned delay ($T_{fd}(E_i)$). However, in certain examples, the management station 108 may directly determine the delay ($T_{d-direct}(E_i)$) that is already fine-tuned based on based on the rate at which the events are received from the network devices 102-106 at the management station 108 and one or more of types of the events, resource utilization at the management station 108, or hierarchical depths corresponding to the network devices 102-106 sending the events. In one example, the management station 108 may calculate the delay ($T_{d-direct}(E_i)$) using following equation (3).

$$T_{d-direct}(E_i) = Avg\left(\frac{(R_b * R_m)}{N}\%, R_u, W_{depth}, W_{predef}\right) \quad \text{Equation (3)}$$

Once the delay is determined, the management station 108 may schedule processing of the events based on the delay. In the description of FIG. 1 hereinafter, the term delay may represent any of the delay ($T_d$) calculated using equation (1), the fine-tuned delay ($T_{fd}(E_i)$) calculated using equation (2), or the delay $T_{d-direct}(E_i)$ calculated using equation (3). In some examples, scheduling of the events may include staggering of the events, deduplication of the events, processing of the events by bypassing the staggering and deduplication, or combinations thereof. The term "staggering" or "stagger" as used herein may refer to scheduling processing of the events in a sequential manner. Further, the term "deduplication" as used herein may refer to accumulating a set of similar type of events received in a given deduplication time window and identifying a single event from the set of similar type of events, wherein the identified event may be processed by the management station 108.

Figure 3:
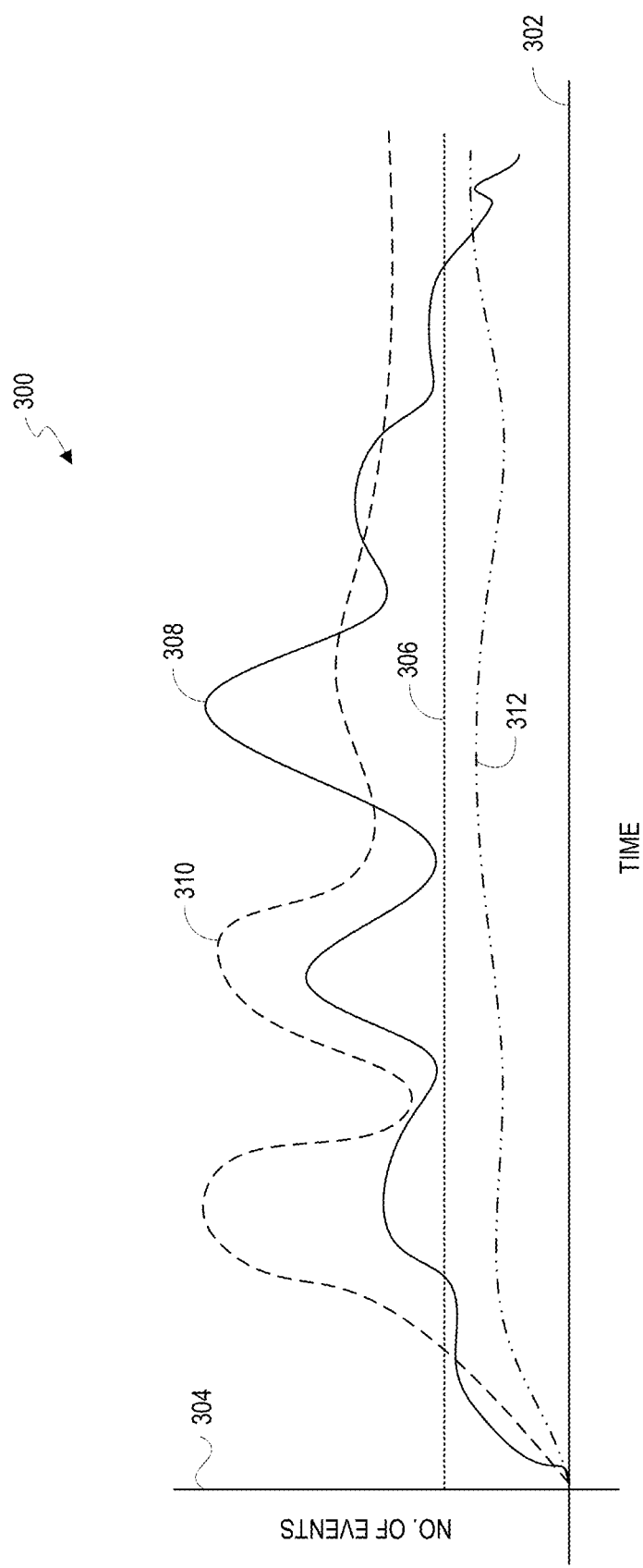
FIG. 3 shows a graphical representation depicting trends of receiving events from each network device, in accordance with an example.

In some examples, the management station 108 may identify a set of network devices from the network devices 102-106, wherein the set of network devices sends events at a rate higher than the base average event rate (see FIG. 3, for example). Referring now to FIG. 3, a graphical representation 300 depicting trends of receiving events from individual network devices 102, 104, and 106, in accordance with an example. The reference numerals 302 and 304 respectively represent X-axis and Y-axis of the graphical representation 300. The X-axis 302 may represent time and Y-axis 304 may represent number of events. A line 306 may represent a base average event rate, for example, the based average event rate. Further, trend lines 308, 310, and 312 may represent trends of receiving events, respectively, from each of the network devices 102, 104, and 106 over a period of time. As depicted in FIG. 3, the network devices 102 and 104 send events at a rate higher than the base average event rate, while the network device 106 sends events at a rate lower than the base average event rate. Accordingly, the management station 108 may identify the network devices 102 and 104 as the devices sending events at the rate higher than the base average event rate.

Referring back to FIG. 1, in some examples, the management station 108 may schedule processing of the events received from the set of network devices that are sending events at the rate higher than the base average event rate. Whereas, in certain examples, the management station 108 may process the events received from network devices that are sending the events at a rate equal to or lower than the base average event rate in a normal manner (i.e., without performing staggering or deduplication).

In some examples, the management station 108 may stagger certain events. For example, ten (10) parallel Post Discovery Complete (PDC) events from different network devices may be staggered. If such PDC events are not staggered, the management station 108 might have to perform ten parallel inventory collection jobs causing high resource usage at the management station 108. Further, in some examples, the management station 108 may perform deduplication for certain events. For example, the management station 108 may perform deduplication for ten Resource Updated events from same network device. In some examples, for certain types of events, the management station 108 may perform staggering of the events followed by deduplication the events or vice versa. Whereas, in some examples, the management station 108 may process certain types of events, for example, alerts, without performing staggering or deduplication.

In accordance with aspects of the present disclosure, in performing staggering of the events, the management station 108 may wait for a time duration corresponding to the delay before processing each of the events. In some examples, the management station 108 may wait for a time duration corresponding to the delay before processing each of the events received from the set of network devices (e.g., the network devices 102, 104) sending events at a rate higher than the base average event rate.

Further, in certain examples, the management station 108 may determine the deduplication time window based on the delay. In some examples, determining the deduplication time window by the management station 108 may include extending an existing or predefined deduplication time window by adding the delay to the existing or predefined deduplication time window. Accordingly, the management station 108 may accumulate larger number of events in such extended deduplication time window in comparison to the existing or predefined deduplication time window. Accordingly, the management station 108 perform deduplication for a set of the similar type of events received in the deduplication time window determined by the management station 108.

Once the events are through the scheduling (e.g., staggering, deduplication, both the staggering and deduplication) by the management station 108, the events may be processed by the management station 108. In some examples, the management station 108 may process certain types of events (e.g., alerts) by bypassing the staggering and/or deduplication. In order to process the events, the management station 108 may identify one or more jobs to be performed corresponding to each event and execute the identified jobs. As described earlier, the management station 108 may identify the jobs corresponding to the received events based on the look-up table 118.

In some examples, in order to process the events, the management station 108 may utilize one or more software defined consumer modules corresponding to the events. In certain examples, the look-up table 118 may include additional details about a consumer module that can process a given event. In particular, the look-up table 118 may include an additional column that contain information about the consumer module that can process the events listed in the first column (see table-1). The consumer modules may be implemented using one or more executable instructions in the machine-readable medium 114. Each consumer module may include same or different types of the executable instructions to execute various jobs corresponding to the respective events. It may be noted that the present disclosure is not limited with respect how the jobs corresponding to the events are processed.

Advantageously, by scheduling the processing of the events at the management station 104, resource utilization of the management station 108 may be controlled. Also, selective delaying of the processing of consecutive events and/or adjusting deduplication window based on the delay may further enhance performance of the management station 108 while ensuring completion of desired jobs corresponding the received events. Moreover, due to such controlled use of the resources of the management station 108, reliability of the management station 108 and hence, customer experience may be enhanced.

Figure 4:
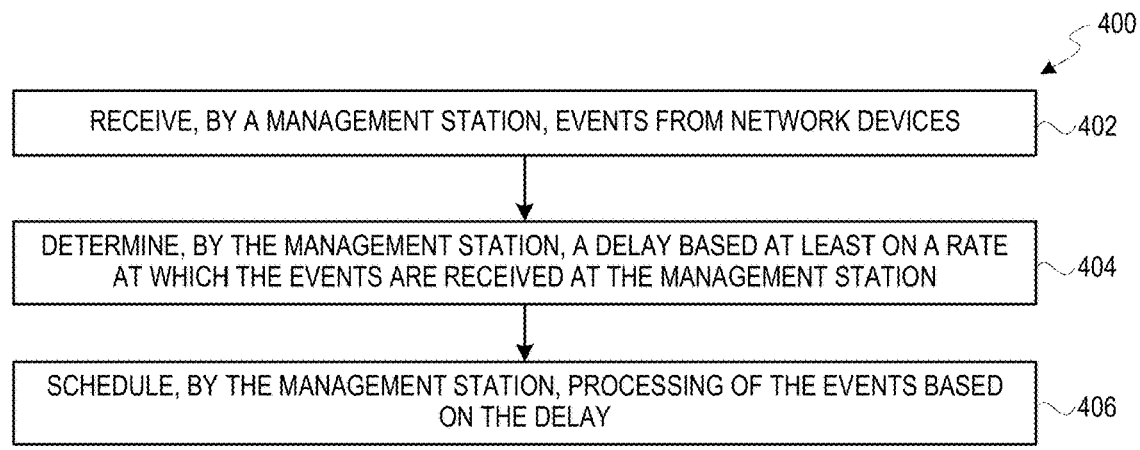
FIG. 4 is a flow diagram depicting a method for managing events received from network devices, in accordance with an example.

Turning now to FIG. 4, a flow diagram depicting a method 400 for managing events received from network devices such as the network devices 102-106, in accordance with an example. The method 400 is described with reference to the system 100 of FIG. 1. For the sake of brevity, description of certain features that are already described in FIG. 1 is not repeated herein.

As noted earlier, the network devices 102-106 may generate number of events based on various operations performed on the network devices 102-106. The network devices 102-106 may send such events to the management station 108. At block 402, the method 400 may include receiving, by the management station 108, the events generated by the network devices 102-106. The management station 108 may continue to receive the events over a period of time. At block 404, the method 400 may include determining a delay based at least on a rate at which the events are received at the management station 108. The management station 108 may determine the delay based on the rate such as the based average event rate and the moving average event rate. In one example, the management station 108 may determine the delay using a relationship shown in equation (1). In certain examples, the delay determined using equation (1) may be fine-tuned by the management station 108 using a relationship shown in equation (2). In some examples, the management station 108 may determine the delay based on the rate at which the events are received from the network devices 102-106 and one or more of types of the events, resource utilization at the management station 108, or the hierarchical depths corresponding to the network devices 102-106 sending the events using a relationship shown in equation (3), for example. Additional details of determining the delay is described in conjunction with FIG. 1.

Moreover, at block 406, the method 400 may include scheduling processing of the events based on the delay. In some examples, the management station 108 may schedule processing of the events based on the delay determined at block 404. In particular, the management station 108 may control staggering and/or deduplication of the events based on the delay. Additional details of scheduling processing of the events based on the delay is described in conjunction with FIGS. 1 and 5.

Figure 5:
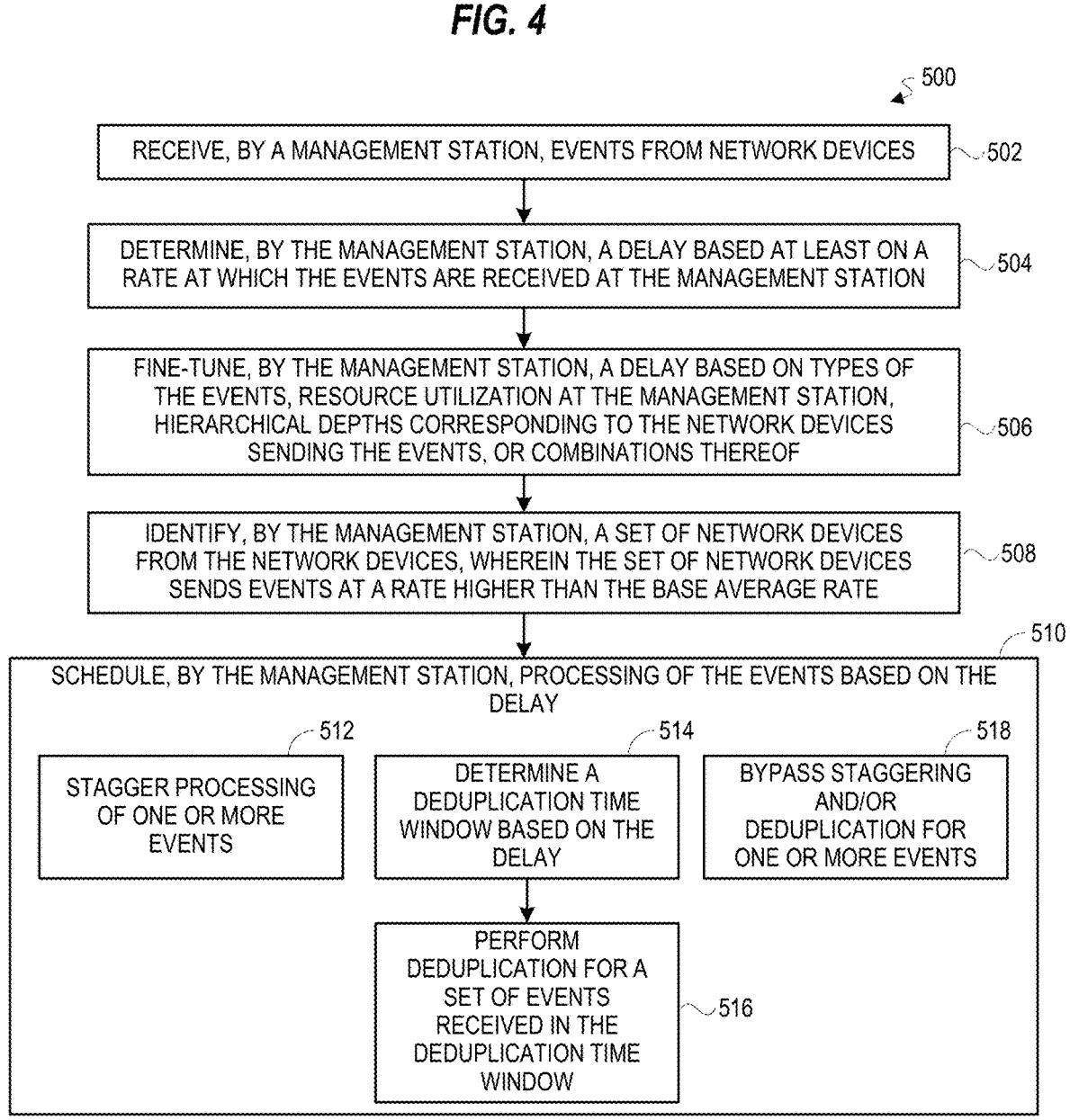
FIG. 5 is a flow diagram depicting a detailed method for managing events received from network devices, in accordance with another example.

Referring now to FIG. 5, a flow diagram depicting a detailed method 500 for managing events received from network devices 102-106 is presented, in accordance with another example. The method 500 will be described with reference to the system 100 of FIG. 1. For the sake of brevity, description of certain features that are already described in FIG. 1 or FIG. 4 is not repeated herein.

At block 502, the method 500 may include receiving, by the management station 108, the events generated by the network devices 102-106. The management station 108 may continue to receive the events over a period of time. At block 504, the method 500 may include determining a delay based at least on a rate at which the events are received at the management station 108. The management station 108 may determine the delay based on the rate such as the based average event rate and the moving average event rate. In one example, the management station 108 may determine the delay ($T_d$) using a relationship shown in equation (1). Further, in some examples, at block 506, the management station 108 may fine-tune the delay based on types of the events, resource utilization at the management station 108, hierarchical depths corresponding to the network devices sending the events, or combinations thereof. By way of example, the management station 108 may determine a fine-tuned delay ($T_{fd}$) using the relationship of equation (2).

Moreover, in some examples, at block 508, the management station 108 may identify a set of network devices that generate events at a rate higher than the base average event rate of the network devices 102-106. For instance, as shown in FIG. 3, if the network devices 102 and 104 send events at the rate higher than the base average event rate, the management station 108 may identify the network devices 102 and 104 as such devices. In certain examples, the method as illustrated by the block 510 may be performed for the network devices identified at the block 508.

In some examples, at block 510, the management station 108 may schedule processing of the events based on the delay, for example, the delay ($T_d$) or the fine-tuned delay ($T_{fd}$). In one example, the scheduling of processing of events may include staggering processing of one or more events by waiting for at least a duration corresponding to the delay before processing each of the one or more events, as indicated by block 512. In another example, scheduling of processing of events may include determining a deduplication time window based on the delay, for example, the delay ($T_d$) or the fine-tuned delay ($T_{fd}$), as indicated by block 514. Determining the deduplication time window by the management station 108 may include extending an existing or predefined deduplication time window by adding the delay to the existing or predefined deduplication time window. Further, at block 516, the management station 108 may perform deduplication of a set of similar type of events received in the deduplication window determined at block 514. Accordingly, the management station 108 may accumulate larger number of events in such extended deduplication time window in comparison to the existing or predefined deduplication time window.

In certain examples, at block 518, scheduling of processing of events may include bypassing the staggering and deduplication of the events. In other words, certain events may be processed without performing any of the staggering and deduplication.

Figure 6:
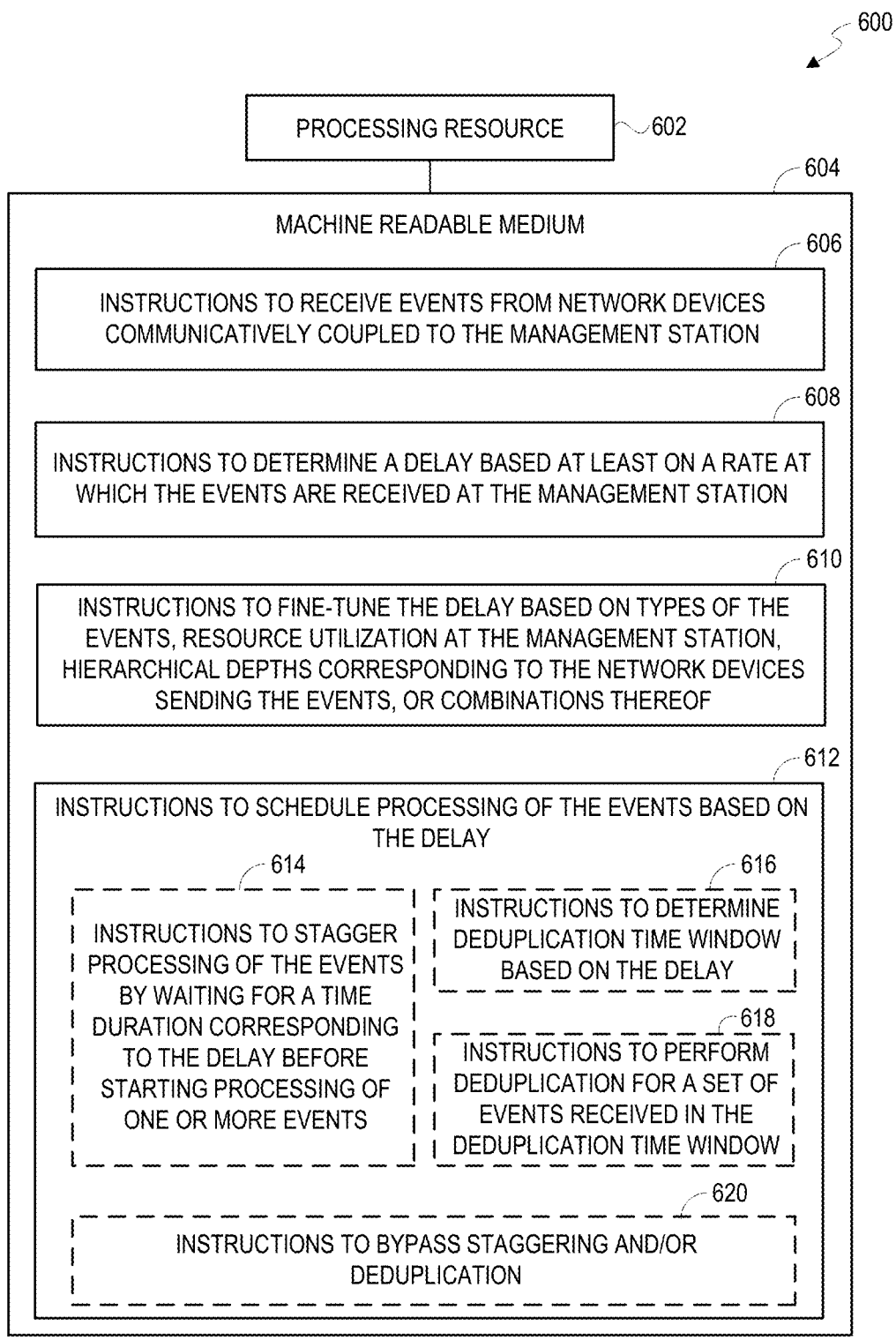
FIG. 6 is a block diagram depicting a processing resource and a machine-readable medium encoded with example instructions to manage events received from network devices, in accordance with an example.

In FIG. 6, a block diagram 600 depicting a processing resource 602 and a machine-readable medium 604 encoded with example instructions to manage events received from network devices, such as, the network devices 102-106 is presented, in accordance with an example. The machine-readable medium 604 may be non-transitory and is alternatively referred to as a non-transitory machine-readable medium 604. In some examples, the machine-readable medium 604 may be accessed by the processing resource 602. In some examples, the processing resource 602 may represent one example of the processing resource 112 of the management station 108 of FIG. 1. Further, the machine-readable medium 604 may represent one example of the machine-readable medium 114 of the management station 108.

The machine-readable medium 604 may be any electronic, magnetic, optical, or other physical storage device that may store data and/or executable instructions. Therefore, the machine-readable medium 604 may be, for example, RAM, an EEPROM, a storage drive, a flash memory, a CD-ROM, and the like. As described in detail herein, the machine-readable medium 604 may be encoded with executable instructions 606-612 for performing one or more methods, for example, methods described in FIGS. 4 and 5. The instructions 606-612 may represent one example of the instructions 116 of FIG. 1.

The processing resource 602 may be a physical device, for example, one or more CPU, one or more semiconductor-based microprocessor, one or more GPU, ASIC, FPGA, other hardware devices capable of retrieving and executing of the instructions 606-612 stored in the machine-readable medium 604, or combinations thereof. In some examples, the processing resource 602 may fetch, decode, and execute the instructions 606-612 stored in the machine-readable medium 604 to manage processing of the events received from the network devices 102-106. In certain examples, as an alternative or in addition to retrieving and executing the instructions 606-612, the processing resource 602 may include at least one IC, other control logic, other electronic circuits, or combinations thereof that include a number of electronic components for performing the functionalities intended to be performed by the management station 108.

The instructions 606, when executed, may cause the processing resource 602 to receive events from the network devices 102-106 communicatively coupled to the management station 108. Further, the instructions 608, when executed, may cause the processing resource 602 to determine a delay based at least on a rate at which the events are received at the management station 108. For example, the rate at which the events are received at the management station 108 may be the base average event rate and the moving average event rate. In some examples, the management station 108 may determine the delay using the relationships shown in any of the equations 1, 2, or 3. Moreover, in some examples, the instructions 610, when executed, may cause the processing resource 602 to fine-tune the delay based on types of the events, the resource utilization at the management station 108, the hierarchical depths corresponding to the network devices 102-106 sending the events, or combinations thereof. For example, the delay calculated based on the base average event rate and the moving average event rate (e.g., using the equation (1)) may further be fine-tuned using the relationship of equation (2).

Furthermore, in some examples, the instructions 612, when executed, may cause the processing resource 602 to schedule processing of the events based on the delay. The instructions 612 for scheduling the processing of the events may further include one or more of instructions 614, 616, 618, or 620. In some examples, the instructions 614, when executed by the processing resource 602, may cause the processing resource 602 to stagger processing of one or more events by waiting for at least a duration corresponding to the delay (e.g., the delay ($T_d$), the fine-tuned delay ($T_{fd}(E_i)$), or the delay $T_d(E_i)$) before processing each of the one or more events. Further, in some examples, the instructions 616, when executed by the processing resource 602, may cause the processing resource 602 to deduplication time window based on the delay (e.g., the delay ($T_d$), the fine-tuned delay ($T_{fd}(E_i)$), or the delay $T_d(E_i)$). Furthermore, the instructions 618, when executed by the processing resource 602, may cause the processing resource 602 to perform deduplication for a set of similar type of events received in the deduplication time window. Moreover, in some examples, the instructions 620, when executed by the processing resource 602, may cause the processing resource 602 to bypass the staggering and/or deduplication of the events. In such case, the events may be directly processed by the processing resource 602.

While certain implementations have been shown and described above, various changes in form and details may be made. For example, some features, functions, and/or formulas/equations that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   receiving, by a management station, events from network devices communicatively coupled to the management station;
   determining, by the management station, a delay based at least on a rate at which the events are received at the management station, wherein the rate at which the events are received by the management station comprises one or both of a base average event rate of receiving the events and a moving average event rate of receiving the events at the management station; and
   scheduling, by the management station, processing of the events based on the delay.

2. The method of claim 1, further comprising fine-tuning the delay by the management station based on types of the events, resource utilization at the management station, hierarchical depths corresponding to the network devices sending the events, or combinations thereof.

3. The method of claim 1, wherein the network devices comprise a server, a storage device, a network switch, a router, a mobile communication device, a desktop computer, a portable computer, a network device enclosure, or combinations thereof.

4. The method of claim 1, wherein the events comprise one or more of lifecycle events or alerts, wherein the lifecycle events comprise a resource added event, a resource deleted event, a resource update event, a resource status change event, a resource power-ON event, a resource power-OFF event, or combinations thereof.

5. The method of claim 1, wherein scheduling processing of the events comprises staggering processing of one or more events by waiting for at least a duration corresponding to the delay before processing each of the one or more events.

6. The method of claim 1, further comprising:
   determining a deduplication time window based on the delay; and
   performing deduplication for a set of the events received in the deduplication time window.

7. The method of claim 1, wherein scheduling processing of the events comprises processing one or more events without performing staggering and deduplication of the one or more events.

8. The method of claim 1, wherein the delay is determined as a product of the base average event rate and the moving average event rate divided by a number of the network devices that are sending events at a rate higher than the base average event rate.

9. The method of claim 8, further comprising identifying a set of network devices from the network devices, wherein the set of network devices sends events at a rate higher than the base average event rate, and wherein processing of the events received from the set of network devices is scheduled based on the delay.

10. A system, comprising:
   network devices, wherein the network devices generate events based on operations performed by the network devices; and
   a management station coupled to the network devices, wherein the management station is to:
      receive the events from the network devices;
      determine a delay based on a rate at which the events are received from the network devices at the management station and one or more of types of the events, resource utilization at the management station, or hierarchical depths corresponding to the network devices sending the events;
      identify a set of network devices sending the events at a rate higher than a base average event rate; and
      schedule processing of the events originated from the set of network devices based on the delay.

11. The system of claim 10, wherein the network devices comprise a server, a storage device, a network switch, a router, a mobile communication device, a desktop computer, a portable computer, a network device enclosure, or combinations thereof.

12. The system of claim 10, wherein the management station staggers processing of one or more events by waiting for at least a duration corresponding to the delay before processing each of the one or more events.

13. The system of claim 10, wherein the management station:
   determines a deduplication time window based on the delay; and
   performs deduplication for a set of the events received in the deduplication time window.

14. A non-transitory machine-readable medium storing instructions executable by a processing resource, the instructions comprising:
   instructions to receive events from network devices communicatively coupled to a management station;
   instructions to determine a delay based at least on a rate at which the events are received at the management station, wherein the rate at which the events are received by the management station comprises one or both of a base average event rate of receiving the events and a moving average event rate of receiving the events at the management station; and
   instructions to schedule processing of the events based on the delay.

15. The non-transitory machine-readable medium of claim 14, further comprising instructions to fine-tune the delay based on types of the events, resource utilization at the management station, hierarchical depths corresponding to the network devices sending the events, or combinations thereof.

16. The non-transitory machine-readable medium of claim 14, wherein the instructions to schedule processing of the events comprise instructions to stagger processing of one or more events by waiting for at least a duration corresponding to the delay before processing each of the one or more events.

17. The non-transitory machine-readable medium of claim 14, wherein the instructions to schedule processing of the events comprise instructions to determine a deduplication time window based on the delay.

18. The non-transitory machine-readable medium of claim 17, further comprising instructions to perform deduplication for a set of the events received in the deduplication time window.

* * * * *